United States Patent [19]

Rahman et al.

[11] 3,987,208

[45] Oct. 19, 1976

[54] METHOD OF EXTENDING THE STORAGE LIFE OF CUT LETTUCE

[75] Inventors: Abdul R. Rahman, Natick; Glenn R. Schafer, Framingham; Wayne M. Swantak, Norfolk; Kenneth M. Plummer, Natick, all of Mass.

[73] Assignee: The United States of America as represented by the Secretary of the Army, Washington, D.C.

[22] Filed: Mar. 25, 1976

[21] Appl. No.: 670,340

[52] U.S. Cl. ............................... 426/326; 426/335;
426/532; 426/541; 426/415; 426/269
[51] Int. Cl.² ........................ A23B 7/10; A23B 7/14
[58] Field of Search ........... 426/268, 269, 270, 310, 426/316, 327, 324, 326, 415, 335, 541, 532, 615

[56] References Cited
UNITED STATES PATENTS

| | | | |
|---|---|---|---|
| 2,698,804 | 1/1955 | Crisafulli et al. | 426/324 |
| 3,795,749 | 3/1974 | Cummin | 426/415 |
| 3,814,820 | 6/1974 | Busta et al. | 426/268 |
| 3,849,581 | 11/1974 | Kubu | 426/541 |

*Primary Examiner*—Jeanette M. Hunter
*Attorney, Agent, or Firm*—Nathan Edelberg; Robert P. Gibson; Charles C. Rainey

[57] ABSTRACT

Treating lettuce for use in salads and the like to extend the storage life of said lettuce to at least about 4 weeks under refrigeration. The lettuce leaves are subdivided by cutting and treated with an aqueous solution of sodium meta bisulfite, citric acid, ascorbic acid, and potassium sorbate. Excess solution is removed from the cut lettuce, which then is enclosed in plastic bags made of vinylidine chloride-vinyl acetate copolymer film having low rates of transmission of oxygen, carbon dioxide, and water vapor. The plastic bags of treated cut lettuce are tightly closed to prevent intermixing of outside air with the interior atmosphere of the bags and the treated cut lettuce, and they are stored at about $1.7° \pm 1.0$.

10 Claims, No Drawings

METHOD OF EXTENDING THE STORAGE LIFE OF CUT LETTUCE

The invention described herein may be manufactured, used, and licensed by or for the Government for governmental purposes without the payment to us of any royalty thereon.

BACKGROUND OF THE INVENTION

This invention relates to a method of treating lettuce for use in salads and the like to extend the storage life of the lettuce to about 4 weeks or more under refrigeration.

Lettuce is one of the most perishable of foods. To remain usable following harvesting, it normally requires refrigerated shipping and storage, preferably in a controlled atmosphere. In recent years much interest has developed in the preprocessing of the more common ingredients of salads, either mixed or kept separated until shortly before being served. This involves more or less cutting or other subdivision of the salad components, which has a tendency to hasten deterioration of the subdivided vegetables because of the release of enzymes and moisture from the tissues that are cut or otherwise damaged during subdivision of the vegetable. Much effort has been expended on the problem of extending the storage life of cut lettuce by slowing down its loss of too much of the crispness as well as attractive green color normally associated with and expected of lettuce in a salad. Once lettuce begins to deteriorate, it rapidly loses its desirability for salads or in sandwiches or for any other conventional food usage thereof. Numerous kinds of deterioration of lettuce can occur, such as wilting, bacterial growth, fungal growth, the natural reactions caused by enzymes present in the lettuce tissues, and the effects of oxidations. Deterioration probably begins as soon as a head of lettuce is cut from its stalk in the field. The problem then becomes one of slowing down as much as possible a variety of possible routes of deterioration any one of which, if allowed to take its usual natural course, will result in the necessity to discard the lettuce much sooner than one wishes to have occur.

Kubu, U.S. Pat. No. 3,849,581, discloses a method for treating shredded lettuce to prevent wilting and discoloration during storage by treating the shredded lettuce with an antioxidant solution, draining, and centrifuging to partially dehydrate the treated lettuce. Cummin et al., U.S. Pat. No. 3,795,749, discloses a method for extending the storage life of heads of lettuce by packaging the heads soon after harvesting in plasticized polyvinyl chloride film having at least three times as great permeability to carbon dioxide as to oxygen and a certain minimum permeability to carbon dioxide. Moisture vapor permeability of the film may also be important for allowing the escape of a desirable amount of, but not too much, moisture from the lettuce. The heads of lettuce may also be treated with antimicrobial agents, such as chlorine solutions. Various types and combinations of plastic films have been proposed for packaging fresh or raw vegetables, including lettuce, for example, Purcell et al., U.S. Pat. No. 3,423,212, Badran et al., U.S. Pat. No. 3,450,543, and Rumberger, U.S. Pat. No. 3,630,759. These methods have helped to greater or lesser degrees in staving off deterioration of various vegetables; but none has proven adequate for cut lettuce to render it capable of being stored in a refrigerated area for a fairly long time in this precut state while retaining its desirable characteristics after such long storage in cut form.

An article in Food Service Processing & Packaging, Vol. 34, No. 9, page 14, entitled "Preprocessed Salad Components — Extend Life, Cut Volume Up To 65%" describes some of the preliminary research work which led to the invention described and claimed herein. However, the packaging of the chemically treated lettuce plays a very important part in determining the storage life of cut lettuce. Furthermore, the permeability of the packaging material with respect to oxygen, carbon dioxide, and moisture vapor is important for this purpose, as will be apparent as the description of the invention proceeds.

It is, therefore, an object of the invention to provide a method of treating cut lettuce to extend the storage life thereof under refrigeration.

Other objects and advantages will become apparent from the following description of the invention.

SUMMARY OF THE INVENTION

The storage life of cut lettuce under refrigeration is extended by a method of treating the cut lettuce with a dilute aqueous solution of sodium meta bisulfite, citric acid, ascorbic acid, and potassium sorbate, removing the excess of the solution from the surfaces of the cut lettuce, packaging the treated, cut lettuce in bags of vinylidine chloride-vinyl acetate copolymer film of a thickness such that its oxygen, carbon dioxide and water vapor transmission rates are all low, and closing the plastic film bags sufficiently tightly to substantially prevent intermixing of air from the external atmosphere with the internal atmosphere of the bag and with the cut lettuce. The oxygen content of the headspace gases in the bag is kept low and the carbon dioxide content is kept high since oxygen penetrates into the bag extremely slowly and carbon dioxide formed by respiration of the lettuce inside of the bag is permitted to migrate out of the bag only very slowly.

DESCRIPTION OF THE PREFERRED EMBODIMENT

Lettuce leaves from heads of Iceberg lettuce are subdivided by cutting into pieces from about 2 cm to about 5 cm in length or width and treated in accordance with the invention by dipping the cut lettuce for approximately one minute in an aqueous solution comprising about 0.9 percent sodium meta bisulfite, about 0.06 percent citric acid, about 0.03 percent ascorbic acid, and about 0.2 percent potassium sorbate, said solution held at a temperature of about 5° C ± 2. This solution is drained from the cut lettuce and the cut lettuce is then centrifuged at about 1200 r.p.m. for about 1 minute to remove therefrom substantially all of the solution remaining on the surfaces of the cut lettuce. The centrifuged, cut lettuce is placed in plastic bags made of vinylidene chloride-vinyl acetate copolymer film, manufactured by Union Carbide Corp. under the tradename "Perflex 66", having a thickness of about 1.75 mils, the bags being about 46 cm wide and about 61 cm long and holding about 2 kg of the centrifuged, cut lettuce. Most of the inside air is expelled and the bags are closed sufficiently tightly to substantially prevent migration of oxygen of the air into the bags from the external atmosphere. The oxygen transmission rate of the vinylidene chloride-vinyl acetate copolymer film is about 9–13 cc/100 in 2/24 hrs. at 21° C, determined by the A.S.T.M. Standard D1434-63. The carbon dioxide transmission rate of the film is about 31 cc/100 in 2/24 hrs. at 21° C, determined by the A.S.T.M. Standard D1434-63. The moisture vapor transmission rate of the film is about 0.8–1.2g/100 in 2/24 hrs., determined by the A.S.T.M. Standard E96DS-66T. Whatever oxygen is present in the bags when they are closed with the treated, cut lettuce therein plus whatever small amount of oxygen migrates in through the film is gradually used up by the respiration of the lettuce, and the concentration of carbon dioxide within the bags gradually increases as a result thereof since the carbon dioxide transmission rate of the film is so low that most of the carbon dioxide formed is effectually trapped within the bags. The treated, cut lettuce in the closed vinylidene chloride-vinyl acetate copolymer film bags is stored at about 1.7° C ± 1.0 for various lengths of time. Samples of the headspace gases in the bags are taken at various intervals of time and analyzed for oxygen and carbon dioxide contents. Also, samples of the treated, packaged, and stored, cut lettuce are tested at various time intervals by submission thereof to a technological panel of 10 food technologists, who are requested to rate the samples for overall quality, applying thereto the so-called hedonic scale, which is a nine point scale, a value of 1 representing extreme dislike or extremely low overall quality, a value of 9 representing extreme like or extremely high overall quality, and a value of 5 representing neither like nor dislike, and therefore borderline acceptability. Control samples which are packaged in the same type of film bags, but which do not receive the chemical treatment, are also tested. However, results are not given for the control samples beyond 13 days of storage since after that length of time, these samples have deteriorated so badly that it is impossible to carry out hedonic scale evaluations thereof. The results of these tests are given in Table 1.

TABLE 1

|  | Days storage after packaging | Hedonic Scale Evaluation | $O_2$ (percent by volume in head space) | $CO_2$ (percent by volume in head space) |
| --- | --- | --- | --- | --- |
| Control | 0 | 7.4 | 20.0 | 0.5 |
|  | 7 | 5.6 | — | 2.9 |
|  | 13 | 4.8 | 0.9 | — |
| Treated with chemical solution | 0 | 7.4 | 20.0 | 0.5 |
|  | 7 | 7.3 | 0.9 | 25.5 |
|  | 13 | 6.9 | 0.2 | 27.4 |
|  | 21 | 6.0 | 1.1 | 21.1 |
|  | 27 | 6.3 | 1.5 | 25.7 |

It is apparent from the results in Table 1 that the cut lettuce, treated and packaged in accordance with the above-described procedure, was quite acceptable even after 27 days storage at 1.7° C. ± 1.0, whereas the untreated control samples, packaged in the same manner as the treated samples, were unacceptable after only 13 days storage under the same storage conditions. In view of the hedonic scale evaluations of the treated, cut lettuce, it would appear quite likely that the treated, packaged, and refrigerated samples would be usable for human consumption somewhat after 27 days of storage.

Unless otherwise indicated herein, percentages are by weight.

Other characteristics of the vinylidene chloride-vinyl acetate copolymer film employed in the plastic bags in which the treated, cut lettuce is packaged are as shown in Table 2:

TABLE 2

| Property | Unit | Typical Value Range |
| --- | --- | --- |
| Tensile Strength | lbs/sq. in. |  |
| Machine Direction |  | 12,000–16,000 |
| Transverse Direction |  | 12,000–16,000 |
| Elongation at Break | % |  |
| Machine Direction |  | 80–120 |
| Transverse Direction |  | 80–120 |
| Elmendorf Tear | gms |  |
| Machine Direction |  | 55–90 |
| Transverse Direction |  | 55–90 |
| Tensile Modulus at 30°F | lbs/sq. in. | 30,000–35,000 |
| Shrinkage at 90°C (194°F) | % |  |
| Machine Direction |  | 25–35 |
| Transverse Direction |  | 25–35 |

Other varieties of lettuce may be treated and packaged for refrigerated storage in accordance with the invention. For example, Romaine lettuce, leafy or garden lettuce, and any other known variety of lettuce in cut or otherwise subdivided form may be provided an extended storage life in accordance with the invention.

The lettuce leaves may be subdivided into a wide range of shapes and sizes of pieces, preferably by cutting, the subdivision of the lettuce leaves ranging from leaves cut in half to finely shredded lettuce leaves. The preferred form of subdivision is, as previously mentioned, cut pieces ranging from about 2 cm to about 5 cm in length and width.

The concentrations of the ingredients of the aqueous solution used in treating the cut lettuce prior to packaging thereof may be varied by ± 10.0 percent while still producing acceptable storage life of the treated and packaged lettuce under the refrigeration conditions indicated above.

The dimensions and capacities of the vinylidene chloride-vinyl acetate copolymer film bags used for packaging the treated, cut lettuce may be varied over wide ranges, the prime requisite in this regard being the amount of cut lettuce that may be needed in the preparation of salads for a group of human subjects for a given meal, since once a bag is opened in a mess facility or in the field, oxidation deterioration will increase rapidly even if the bag is reclosed and returned to refrigerated storage, particularly if the bag is reclosed without first removing substantially all of the oxygen therefrom.

In general, the centrifuging of the treated, cut lettuce should be carried out at a speed sufficiently great and for a time sufficient to remove the excess of the aqueous treating solution without damaging the cellular structure of the lettuce any more than the cutting of the leaves has already caused. It is well-known that lettuce and other vegetables may be severely damaged by centrifuging at very high speeds. Hence the centrifuging is kept to a fairly low value, such as in the vicinity of about 1200 r.p.m. for 0.6–1.0 minute, so as to produce treated, cut lettuce which will have the best possible refrigerated storage characteristics.

Precut, treated, and packaged lettuce prepared in accordance with the present invention is useful in preparing salads or for other food usage long after untreated lettuce, even though packaged and stored in accordance with the invention, becomes unfit for human consumption. The precut lettuce has to be both pretreated and packaged in accordance with the invention in order for it to have the lengthy storage life under refrigeration as shown above. Without both, the lettuce deteriorates rapidly, even when refrigerated, and becomes unfit for use as food in a very short time after being cut.

We wish it to be understood that we do not desire to be limited to the exact details described, for obvious modifications will occur to a person skilled in the art.

We claim:

1. Method of treating lettuce for use in salads and the like uses to extend the storage life of said lettuce under refrigeration, which comprises the steps of:
   a. cutting the leaves of said lettuce,
   b. contacting said lettuce pieces with an aqueous solution comprising sodium meta bisulfite, citric acid, ascorbic acid, and potassium sorbate in amounts and at a temperature effective to render said lettuce pieces sufficiently resistant to oxidation and to mold growth thereon to extend the storage life of said lettuce under refrigeration,
   c. removing said lettuce pieces from said solution,
   d. centrifuging said lettuce pieces for a time sufficient to remove substantially all of said solution remaining on the surfaces of said lettuce pieces without damaging said lettuce pieces,
   e. placing a quantity of said lettuce pieces in a plastic bag made of vinylidene chloride-vinyl acetate copolymer film having a thickness of about 1.75 mils,
   f. gently squeezing said lettuce-filled bag to remove a large part of the air therefrom and to make said film fit snugly around said lettuce pieces,
   g. closing said bag sufficiently well to substantially prevent intermixing of air from the external atmosphere with the internal atmosphere of said bag and said lettuce pieces, and
   h. storing said bag of lettuce pieces at a temperature of about $1.7° C \pm 1.0$.

2. Method according to claim 1, wherein the concentrations of the components of said aqueous solution are as follows:
   sodium meta bisulfite about 0.9 percent
   citric acid about 0.06 percent
   ascorbic acid about 0.03 percent
   potassium sorbate about 0.2 percent,
   the remainder of said solution being water.

3. Method according to claim 2, wherein in said step of contacting said lettuce pieces with said aqueous solution, said aqueous solution is maintained at about $5.0° C \pm 2.0$.

4. Method according to claim 3, wherein said lettuce pieces are contacted with said aqueous solution for a time of about 1 minute.

5. Method according to claim 1, wherein said centrifuging of said lettuce pieces is carried out at about 1200 r.p.m. for a time of about 0.6 to about 1.0 minute.

6. Method according to claim 1, wherein said vinylidene chloridevinyl acetate copolymer film is characterized by having an oxygen transmission rate of from about 9 to about 13 cc per 100 square inches per 24 hours per atmosphere, a carbon dioxide transmission rate of about 31 cc per 100 square inches per 24 hours per atmosphere, and a water vapor transmission rate of from about 0.8 to about 1.2 grams per 100 square inches per 24 hours per atmosphere.

7. Method according to claim 1, wherein said closing of said plastic bag is carried out by hermetically sealing said plastic bag.

8. Method according to claim 1, wherein said lettuce leaves are cut into pieces ranging from about 2 centimeters to about 5 centimeters in length and width prior to said step of contacting said lettuce pieces with said aqueous solution.

9. Method according to claim 4, wherein said lettuce leaves are cut into pieces ranging from about 2 centimeters to about 5 centimeters in length and width prior to said step of contacting said lettuce pieces with said aqueous solution.

10. Method according to claim 9, wherein said centrifuging of said lettuce pieces is carried out at about 1200 r.p.m. for a time of about 0.6 to about 1.0 minute.

* * * * *